(12) United States Patent
Kwatra et al.

(10) Patent No.: US 11,367,355 B2
(45) Date of Patent: Jun. 21, 2022

(54) CONTEXTUAL EVENT AWARENESS VIA RISK ANALYSIS AND NOTIFICATION DELIVERY SYSTEM

(71) Applicant: International Business Machines Corporation, Armonk, NY (US)

(72) Inventors: Shikhar Kwatra, Durham, NC (US); Jeremy R. Fox, Georgetown, TX (US); Zachary James Goodman, Euless, TX (US); H. Ramsey Bissex, Irving, TX (US); Ernest Bernard Williams, Jr., Dallas, TX (US)

(73) Assignee: International Business Machines Corporation, Armonk, NY (US)

( * ) Notice: Subject to any disclaimer, the term of this patent is extended or adjusted under 35 U.S.C. 154(b) by 73 days.

(21) Appl. No.: 16/808,635

(22) Filed: Mar. 4, 2020

(65) Prior Publication Data
US 2021/0280065 A1    Sep. 9, 2021

(51) Int. Cl.
| G08G 1/16 | (2006.01) |
| G06N 20/00 | (2019.01) |
| G06F 9/54 | (2006.01) |
| G06N 3/04 | (2006.01) |

(52) U.S. Cl.
CPC ............ *G08G 1/166* (2013.01); *G06F 9/542* (2013.01); *G06N 3/049* (2013.01); *G06N 20/00* (2019.01); *G08G 1/162* (2013.01)

(58) Field of Classification Search
CPC ........ G08G 1/166; G08G 1/162; G08G 1/005; G06N 20/00; G06N 3/049; G06N 3/08; G06N 3/0445; G06N 3/0454; G06F 9/542
See application file for complete search history.

(56) References Cited

U.S. PATENT DOCUMENTS

| 4,897,630 A | 1/1990 | Nykerk |
| 4,931,793 A | 6/1990 | Fuhrmann et al. |
| 6,650,242 B2 | 11/2003 | Clerk et al. |
| 6,731,202 B1 | 5/2004 | Klaus |
| 7,230,538 B2 | 6/2007 | Lai et al. |
| 8,842,005 B1 | 9/2014 | Mittal |
| 8,902,303 B2 | 12/2014 | Na'Aman et al. |

(Continued)

FOREIGN PATENT DOCUMENTS

WO    2017120208 A1    7/2017

OTHER PUBLICATIONS

Bahdanau et al., "Neural Machine Translation by Jointly Learning to Align and Translate" Proceedings of the 2015 International Conference on Learning Representations, May 7-9, 2015, San Diego, California, 15 pages.

(Continued)

*Primary Examiner* — Caroline H Jahnige
(74) *Attorney, Agent, or Firm* — Sonny Z. Zhan

(57) ABSTRACT

In an approach for contextual event awareness, a processor receives contextual information including motion and sound detection. A processor analyzes the contextual information to determine a proximity sequencing including context of an event. A processor applies machine learning to the proximity sequencing to form a risk assessment based on the context of the event impacting a user. A processor determines that the risk assessment exceeds a predetermined threshold. A processor provides a notification of a risk to the user.

5 Claims, 3 Drawing Sheets

(56) References Cited

U.S. PATENT DOCUMENTS

| | | | | |
|---|---|---|---|---|
| 8,953,841 | B1* | 2/2015 | Leblang | G06V 20/20 |
| | | | | 382/103 |
| 9,846,999 | B1* | 12/2017 | Pickover | H04M 1/72403 |
| 10,417,893 | B2 | 9/2019 | Myers et al. | |
| 2017/0089710 | A1 | 3/2017 | Slusar | |
| 2018/0075747 | A1 | 3/2018 | Pahwa | |
| 2018/0173230 | A1* | 6/2018 | Goldman-Shenhar | ...................... |
| | | | | B60W 50/08 |
| 2018/0232904 | A1 | 8/2018 | Zakharevich et al. | |
| 2018/0336424 | A1* | 11/2018 | Jang | G06T 7/20 |
| 2019/0205659 | A1* | 7/2019 | Cuban | G06K 9/00778 |
| 2019/0259284 | A1* | 8/2019 | Khadloya | G06T 7/97 |
| 2019/0353500 | A1* | 11/2019 | Di Pietro | G06N 20/00 |
| 2020/0126424 | A1* | 4/2020 | Raichelgauz | G06K 9/66 |
| 2020/0175289 | A1* | 6/2020 | May | B60W 50/14 |
| 2020/0187829 | A1* | 6/2020 | Mohamed Elmahdy | .................... |
| | | | | A61B 5/112 |
| 2021/0031772 | A1* | 2/2021 | Gomora | B60W 30/09 |
| 2021/0281886 | A1* | 9/2021 | Kota | H04N 5/2252 |

OTHER PUBLICATIONS

Brownlee, Jason, "How Does Attention Work in Encoder-Decoder Recurrent Neural Networks", Deep Learning for Natural Language Processing, Oct. 13, 2017, 2 pages, <https://machinelearningmastery.com/how-does-attention-work-in-encoder-decoder-recurrent-neural-networks/>.

Cho et al., "Learning Phrase Representations using RNN Encoder-Decoder for Statistical Machine Translation", Proceedings of the 2014 Conference on Empirical Methods in Natural Language Processing (EMNLP), Oct. 2014, Doha, Qatar, 15 pages, <https://arxiv.org/abs/1406.1078>.

Kumar, Harshit, "Image Captioning Using Encoder-Decoder", Technical Friday Blog, Image Captioning using encoder-decoder, Jan. 11, 2019, 5 pages, <https://kharshit.github.io/blog/2019/01/11/image-captioning-using-encoder-decoder>.

Liu et al., "SqueezedText: A Real-Time Scene Text Recognition by Binary Convolutional Encoder-Decoder Network", Proceedings of the Thirty-Second AAAI Conference on Artificial Intelligence (AAAI-18), Feb. 2-7, 2018, New Orleans, Louisiana, 8 pages.

Nooney, Kartik, "Deep dive into multi-label classification . . . !  (With detailed Case Study)", Towards Data Science, Jun. 7, 2018, 23 pages, <https://towardsdatascience.com/journey-to-the-center-of-multi-label-classification-384c40229bff>.

Sak et al., "Recurrent Neural Aligner: An Encoder-Decoder Neural Network Model for Sequence to Sequence Mapping", Proceedings of the Conference of the International Speech Communication Association INTERSPEECH, Aug. 20-24, 2017, Stockholm, Sweden, 5 pages.

Sutskever et al., "Sequence to Sequence Learning with Neural Networks", Dec. 14, 2014, 9 pages, <http://arxiv.org/abs/1409.3215>.

Vinyals et al., "Show and Tell: A Neural Image Caption Generator", Proceedings of the 2015 IEEE Conference on Computer Vision and Pattern Recognition (CVPR), Jun. 7-12, 2015, Boston, Massachusetts, 9 pages.

Wang et al., "WalkSafe: A pedestrian safety app for mobile phone users who walk and talk while crossing roads", Proceedings of the 13th International Workshop on Mobile Computing Systems and Applications, HotMobile 2012, Feb. 28-29, 2012, San Diego, CA, 7 pages, <https://www.researchgate.net/publication/254007956_WalkSafe_A_pedestrian_safety_app_for_mobile_phone_users_who_walk_and_talk_while_crossing_roads>.

Xu et al., "Show, Attend and Tell: Neural Image Caption Generation with Visual Attention", Proceedings of the 32nd International Conference on Machine Learning (ICML 2015), Lille, France, Jul. 6-Jul. 11, 2015, 22 pages.

Zhang et al., "A k-Nearest Neighbor Based Algorithm for Multi-label Classification" Proceedings of the 19th Pacific-Asia Conference, PAKDD 2015, Ho Chi Minh City, Vietnam, May 19-22, 2015, 4 pages.

\* cited by examiner

CONTEXTUAL EVENT AWARENESS VIA RISK ANALYSIS AND NOTIFICATION DELIVERY SYSTEM

BACKGROUND

The present disclosure relates generally to the field of image and sound recognition and classification, and more particularly to contextual event awareness via risk analysis and notification delivery system.

Contextual image classification is an approach of classification based on contextual information in images. Sound recognition is a technology based on both traditional pattern recognition theories and audio signal analysis methods. Image processing originates from a general field of signal processing and covers methods used to segment an object of interest. Video processing covers most of the image processing methods, but also includes methods where the temporal nature of video data is exploited. Artificial neural networks are computing systems that are inspired by the biological neural networks. An artificial neural network is based on a collection of connected units or nodes called artificial neurons, which loosely model the neurons in a biological brain. Artificial neural networks have been used on a variety of tasks, including computer vision, speech recognition, machine translation, social network filtering, playing board and video games and medical diagnosis.

SUMMARY

Aspects of an embodiment of the present disclosure disclose an approach for contextual event awareness. A processor receives contextual information including motion and sound detection. A processor analyzes the contextual information to determine a proximity sequencing including context of an event. A processor applies machine learning to the proximity sequencing to form a risk assessment based on the context of the event impacting a user. A processor determines that the risk assessment exceeds a predetermined threshold. A processor provides a notification of a risk to the user.

DETAILED DESCRIPTION

Figure 1:
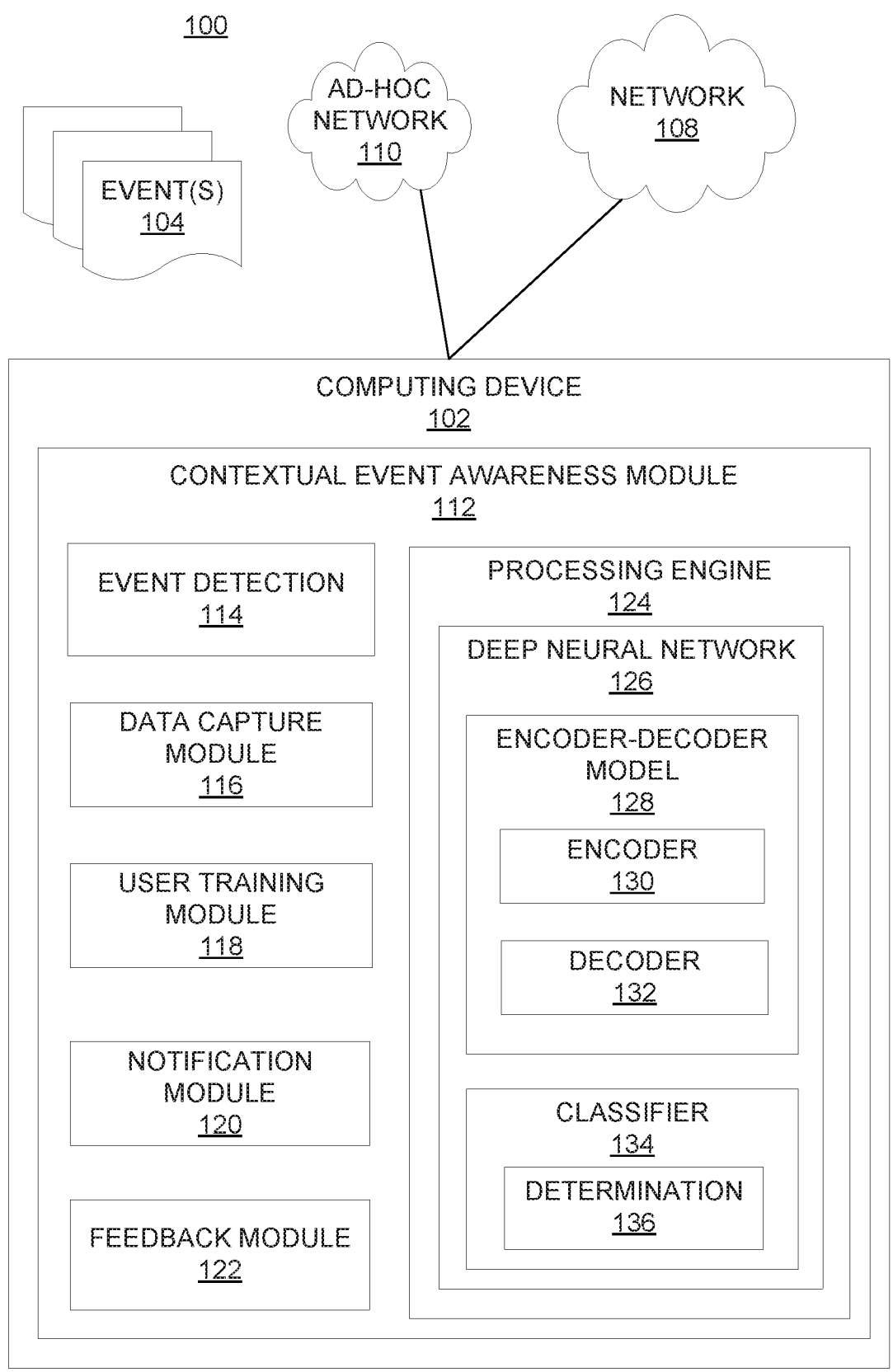
FIG. 1 is a functional block diagram illustrating a contextual event awareness environment, in accordance with an embodiment of the present disclosure.

The present disclosure is directed to systems and methods for contextual event awareness via a risk analysis and notification delivery system.

As a pedestrian, it can be difficult to be aware of activity going on behind oneself, such as the presence of other people or vehicles. With modern technology, such as smart phones or music players, that divert the eyes and ears it becomes even more difficult to notice nearby events and activities going on behind oneself.

An embodiment of the present disclosure discloses detecting audio and motion events behind a user when the user wears or uses a wearable device, such as a mobile device, a smartphone, an augmented reality headset or other suitable device. An embodiment of the present disclosure discloses using a scoring mechanism by an encoder-decoder network in order to determine context of an activity and provide an ameliorative trigger or notification when the activity is determined to be significant.

An embodiment of the present disclosure discloses methods and systems that rely on creation of an encoder-decoder network for attention sequencing with a binary classifier to determine the significance of an event and deploy ameliorative notification strategy in a proactive fashion. The example methods and systems may extend to transferring the potential risk details to other devices and users in the vicinity via an ad-hoc network using a network model disclosed in the present disclosure.

An embodiment of the present disclosure discloses using facial recognition to identify people whom a user may be familiar with. An embodiment of the present disclosure discloses recognizing a proximity of activities or objects to a user, or a person just behind the user.

In one or more embodiments of the present disclosure, a mobile device, an augmented reality device or other suitable device used by a user may detect a vehicle or another person that is rapidly approaching from behind. The augmented reality device or other suitable device may be used by a user, for example, by a construction worker to help protect the construction worker from avoidable accidents. In one or more embodiments of the present disclosure, facial recognition may be used to identify known individuals or friends of the user approaching from behind. Flashing lights of emergency vehicles may be identified for the user when the user uses a mobile device. In another example, a mobile device can be added on to a vehicle to provide a meaningful alert to the user, such as a driver.

In one or more embodiments, a motion or audio event may be captured by various means that may be, for example, infrared, radio, or some other motion detection means. Gait analysis of the user can be considered by using accelerometer data readings. The motion and or audio detection may trigger a camera that audio and video data may be collected from. The captured audio and video data may be sent to a processing engine to determine context of the activity.

In one or more embodiments, a processing engine may be configured to include an encoder-decoder network to determine scoring events and activities associated with a user, for example, behind or near the user when the user uses, for example, a mobile device or a wearable device. The processing engine may use image and sound recognition via a convolution neural network means to analyze the data to determine about the origination event which the data is collected from. The event may be categorized as "interesting" if the user should be notified of the event. The event may be categorized as "uninteresting" if the event does not merit a notification using the encoder-decoder network juxtaposed with a binary classifier. A binary or binomial classification can be the task of classifying the elements of a given set into two groups (predicting which group each one belongs to) on the basis of a classification rule.

An example embodiment of the present disclosure deploys an encoder-decoder model for attention gathering based on pattern sequencing. The encoder-decoder model may include two sub-models: an encoder and a decoder. The encoder may be responsible for stepping through the input time steps and encoding the entire sequence into a fixed length vector called a context vector. The decoder may be responsible for stepping through the output time steps while reading from the context vector. For example, the encoder-decoder model for the dataset may include camera embedded in a headset for capturing nearby contextual situation and run with the sequence of time steps to score the annotations for the second time step. Decoding may be performed as per the encoder-decoder model. Decoder may use the attended context vector for the current time step and the output is fed into the binary classifier. If the output trigger is more than a default risk threshold, the output of the binary classifier may trigger a risk notification for the event with information to distract the user through a notification strategy.

An embodiment of the present disclosure discloses that a notification may be delivered to a user when an event is determined to be "interesting". The notification delivery may be through an augmented reality displayed message. In another example, the notification delivery may be through a haptic vibration to the user. In another example, the notification delivery may be through an audio or voice message to the user. In some examples, if no notification is to be delivered, the event may be ignored by the user.

An embodiment of the present disclosure discloses a user may be asked to provide feedback about the usefulness of the notification when the notification is delivered. The feedback allows the system to learn via reinforcement learning.

The present disclosure will now be described in detail with reference to the Figures. FIG. 1 is a functional block diagram illustrating contextual event awareness environment, generally designated 100, in accordance with an embodiment of the present disclosure.

In the depicted embodiment, contextual event awareness environment 100 includes computing device 102, events 104, network 108, and ad-hoc network 110. In an example, a user can wear, carry and use computing device 102 when walking or moving around. Computing device 102, for example, can be a mobile device, a wearable device, a music player, an augmented reality headset, a virtual reality headset, a computer system such as the one shown in FIG. 3, or any other suitable electronic device. Events 104 may be activities that happen behind or near the user when the user uses computing device 102. For example, events 104 can be motion or sound events happening behind the user. Sometimes the user cannot notice events 104 going on behind the user as eyes and ears of the user can be diverted when using computing device 102 during walk or movement. Entities or subjects may be involved in events 104. In some examples, the entities can be persons. The entities can be vehicles, building objects, flashlights, or any other subjects that are involved in events 104.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In some embodiments, computing device 102 can be a wearable device, a mobile deice, a music player, an augmented reality headset, a virtual reality headset, a computer system such as the one shown in FIG. 3, or any other suitable electronic device. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to contextual event awareness module 112 and network 108 and is capable of processing program instructions and executing contextual event awareness module 112, in accordance with an embodiment of the present disclosure. Computing device 102 may include internal and external hardware components, as depicted and described in further detail with respect to FIG. 3.

Further, in the depicted embodiment, computing device 102 includes contextual event awareness module 112. In the depicted embodiment, contextual event awareness module 112 is located on computing device 102. However, in other embodiments, contextual event awareness module 112 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and contextual event awareness module 112, in accordance with a desired embodiment of the disclosure.

In the depicted embodiment, contextual event awareness module 112 includes event detection 114, data capture module 116, user training module 118, notification module 120, feedback module 122, and processing engine 124. In one or more embodiments, event detection 114 is configured to detect events 104 and trigger data capture module 116 to take images and or videos. In an example, event detection 114 can detect a motion event via infrared, radio, or some other motion detection means involved in events 104. Event detection 114 can use accelerometer data that can be accessed and stored in computing device 102. Gait analysis of the user can be considered by using accelerometer data readings to know the movement status of the user. Event detection 114 may trigger data capture module 116 to take images and or videos when event detection 114 detects a motion event behind or nearby the user. Event detection 114 may trigger data capture module 116 to take images and or videos when the motion is over a pre-determined threshold. In another example, event detection 114 may detect a sound event involved in events 104. A sound event may be a label that people would use to describe a recognizable event in a region of the sound. Such a label usually allows people to understand the concept behind it and associate this event with other known events. Sound events can be used to represent a scene in a symbolic way, e.g. an auditory scene on a busy street contains events of passing cars, car horns and footsteps of people rushing. Auditory scenes can be described with different level descriptors to represent the general context (street) and the characteristic sound events (car, car horn, and footsteps). Event detection 114 may trigger data capture module 116 to take images and or videos when event detection 114 detects a sound event behind or nearby the user. Event detection 114 may trigger data capture module 116 to take images and or videos when the sound is over a pre-defined threshold. Event detection 114 may trigger data capture module 116 to take images and or videos when the sound event is a pre-defined event that the user may be interested. In yet another example, event detection 114 may detect any other activities or entities involved in events 104 in a suitable sensing or detection method and trigger data capture module 116 to take images and or videos to capture data associated with events 104.

In one or more embodiments, data capture module 116 is configured to capture data involved in events 104. Data capture module 116 can be triggered to take images and or videos associated with events 104 when event detection 114 detects events 104. In an example, data capture module 116 can be triggered to take images and or videos associated with events 104 when event detection 114 detects a motion involved with events 104. In another example, data capture module 116 can be triggered to take images and or videos associated with events 104 when event detection 114 detects a sound event involved with events 104. In an example, data capture module 116 may take images with a camera. Data capture module 116 may take images in a sequence with multiple and continuous shots. In another example, data capture module 116 may take videos with a camcorder. Data capture module 116 may capture and sample images from the videos taken. Data capture module 116 may send the captured data, for example, images and or videos, to processing engine 124 to determine context of events 104.

In one or more embodiments, processing engine 124 is configured to analyze the data captured from data capture module 116 to make determination of context about events 104. Processing engine 124 may determine a significance of events 104 based on a user profile and a learned pattern history of the user. Processing engine 124 may categorize events 104 as interesting, neutral, or uninteresting events for the user. Processing engine 124 may communicate notification module 120 to send to the user a notification accordingly. For example, when processing engine 124 categorizes events 104 as interesting events for the user, processing engine 124 may communicate notification module 120 to send the user a notification that events 104 would be interested to the user.

In an example, processing engine 124 may identify and recognize entities involved in events 104 in images captured from data capture module 116. Processing engine 124 may use object recognition technology for finding and identifying entities in the images. Object recognition technology may include edge detection, edge matching, greyscale matching, gradient matching, appearance-based methods, feature-based methods, and other suitable recognition technology for identifying objects in an image or video frame. For example, processing engine 124 may identify the entities such as people, animals, vehicles, and background objects from each image. Processing engine 124 may generate a description that captures not only the entities contained in an image, but can also express how the entities relate to each other as well as events 104 that the entities are involved in.

In the depicted embodiment, processing engine 124 includes deep neural network 126. Deep neural network 126 may be an artificial neural network with multiple layers between the input and output layers. In the depicted embodiment, deep neural network 126 includes encoder-decoder model 128 and classifier 134. Encoder-decoder model 128 may be a model for attention gathering based on pattern sequencing. For example, encoder-decoder model 128 may be a neural network that learns to encode a variable-length sequence into a fixed-length vector representation and to decode a given fixed-length vector representation back into a variable-length sequence. Encoder-decoder model 128 can be trained an end-to-end neural network. In an example, encoder-decoder model 128 can automatically view an image and generate a reasonable description of the image. Encoder-decoder model 128 may be based on a convolution neural network that encodes an image into a compact representation, followed by a recurrent neural network that generates a corresponding sentence. Encoder-decoder model 128 may be trained to maximize the likelihood of the sentence given the image.

In the depicted embodiment, encoder-decoder model 128 includes encoder 130 and decoder 132. Encoder-decoder model 128 may combine the convolutional neural network of encoder 130 for image classification with the recurrent neural network of decoder 132 for sequence modeling, to create a single network that generates descriptions of images. In an example, encoder-decoder model 128 may use encoder 103 as an image encoder, by pre-training it for an image classification task and using the last hidden layer as an input to decoder 132 that generates sentences from images captured in data capture module 116.

In one or more embodiments, encoder 130 may be responsible for stepping through the input time steps and encoding the entire sequence into a fixed length vector called a context vector. In an example, encoder 130 may be a convolutional neural network. A convolutional neural network can be a class of deep neural networks for analyzing images and generating image descriptions. Encoder 130 can be pre-trained and configured to generate image description for each image captured from data capture module 116. Encoder 130, can, for example, be a class of deep neural networks for analyzing visual imagery. Encoder 130 may employ a mathematical operation called convolution. In general, convolution is a specialized kind of linear operation. Encoder 130 may include an input and an output layer, as well as multiple hidden layers. The hidden layers of encoder 130 may include a series of convolutional layers that convolve with a multiplication or other dot product. Encoder 130 may use convolution in place of general matrix multiplication in at least one of their layers. In another embodiment, encoder 130 may be any other neural network or machine learning model that is able to generate image description for each image. Encoder 130 may use a convolutional neural network for the representation of images. Encoder 130 may batch normalization and yield a better performance on a classification competition. Encoder 130 may generalize a scene classification by means of transfer learning.

In one or more embodiments, decoder 132 may be responsible for stepping through the output time steps while reading from the context vector. In an example, decoder 132 can be a recurrent neural network. The recurrent neural network may be a class of artificial neural networks where connections between nodes form a directed graph along a temporal sequence. A recurrent neural network may use its internal state (memory) to process sequences of inputs of frame descriptions. Decoder 132 may be trained in the context of the single end-to-end network of encoder-decoder model 128.

In an example, encoder-decoder model 128 may take a dataset for nearby contextual situation and run with a sequence of time steps to score the annotations for the second time step as: $h1=encoder(x1, x2, x3)$ where $x1$-$x3$ are inputs in the network at the initial time step. Scoring may be performed by using a function $a(\ )$. Each annotation ($h$) may be scored for the first output time step as: $e11=a(0, h1)$; $e12=a(0, h2)$; $e13=a(0, h3)$. Two subscripts may be used for these scores, e.g., $e11$ where the first "1" represents the output time step, and the second "1" represents the input time step. In another example, $e21=a(s1, h1)$; $e22=a(s1, h2)$; $e23=a(s1, h3)$ where the function $a(\ )$ is called the alignment model and these normalized scores evaluated using a softmax function are called annotation weights. The annotation weights predict the possibility of a potential risk.

The information of the possibility of a potential risk may be relayed to the user via alerts so that the user's attention is diverted to subject of interest (said contextual situation). The softmax annotation weights (a) may be calculated given the calculated alignment scores (e): a11=exp(e11)/(exp(e11)+ exp(e12)+exp(e13)). Decoding may be performed as per encoder-decoder model 128 using the attended context vector for the current time step. Output from encoder-decoder model 128 may be fed into classifier 134.

In the depicted embodiment, deep neural network 126 includes encoder-decoder model 128 and classifier 134. Classifier 134 is configured to receive output data from encoder-decoder model 128. Classifier 134 is configured to classify the received output data into an interesting event if the user should be notified of events 104. Classifier 134 may categorize events 104 as an uninteresting event if events 104 do not merit a notification. If the output trigger is more than a pre-determined risk threshold, classifier 134 triggers a risky event with information to distract the user through a notification.

In an example, classifier 134 may be a multi-label classification. The training set for classifier 134 may be composed of instances each associated with a set of labels, and the task is to predict the label sets of unseen instances through analyzing training instances with known label sets. Each label in a multi-label classification represents a different classification task, but the tasks are related. For example, an instance of multi-label classification can be a text about any of religion, politics, finance or education at the same time or none of these. Multi-label classification tasks may be ubiquitous in real-world problems. For example, in a text categorization, each document may belong to several pre-defined topics. Instances in the training set may be each associated with a set of labels, and the task is to output the label set for the unseen instance whose set size is not available a priori. In an example, a multi-label classification algorithm named ML-kNN, i.e. multi-label k-nearest neighbor, may be derived from a k-nearest neighbor (kNN) algorithm. ML-kNN may identify the k nearest neighbors of the test instance where the label sets of its neighboring instances are obtained. After that, maximizing a posteriori principle is employed to predict the set of labels of the test instance.

In the depicted embodiment, classifier 134 includes determination module 136. Determination module 136 is configured to determine that a risk assessment exceeds a predetermined threshold. For example, determination module 136 may trigger a high risk event with information to distract the user through a notification when the output trigger is more than a pre-determined risk threshold.

In one or more embodiments, user training module 118 is configured to provide a dataset and to train processing engine 124 including deep neural network 126. The dataset can be pre-collected data. The dataset can be provided by a user based on a user profile and a learned pattern history. For example, a user may view and like familiar figures and save the information to the user profile. The user may update the user profile and collect the data as an input data for the dataset to train processing engine 124.

In one or more embodiments, notification module 120 is configured to present a notification when an event or entity is interesting to a user. The notification can be presented in various notification means, for example, in an augmented reality displayed message, via a haptic vibration, and or by audio. If no notification is to be delivered, the event information can be ignored or discarded by the user.

In one or more embodiments, feedback module 122 is configured to provide feedback about the usefulness of the notification delivered from notification module 120. If a notification is delivered, the user can be asked to provide feedback about the usefulness of the notification. The feedback collected may allow contextual event awareness module 112 to learn via reinforcement learning.

In the depicted embodiment, ad-hoc network 110 is a network that allows network communications on an ad hoc basis. Contextual event awareness module may extend to transferring the potential risk details to other devices or users in the vicinity via ad-hoc network 110.

Figure 2:
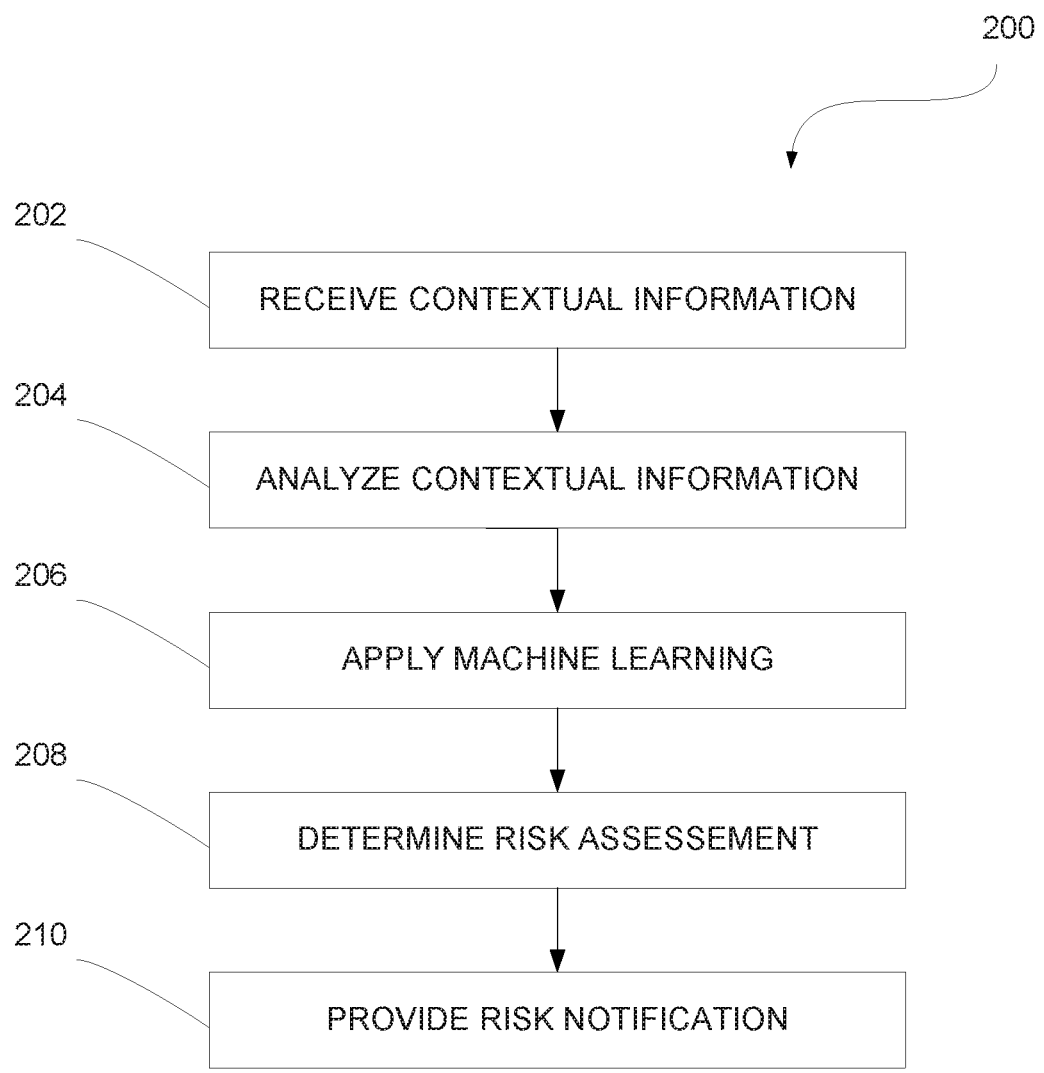
FIG. 2 is a flowchart depicting operational steps of a contextual event awareness module within a computing device of FIG. 1, in accordance with an embodiment of the present disclosure.

FIG. 2 is a flowchart 200 depicting operational steps of contextual event awareness module 112 in accordance with an embodiment of the present disclosure.

Contextual event awareness module 112 operates to receive contextual information including motion and sound detection. Contextual event awareness module 112 also operates to analyze the contextual information to determine a proximity sequencing including a plurality of events, a sequence of the events, and a context of the events. Contextual event awareness module 112 operates to apply machine learning to the proximity sequencing to form a risk assessment. Contextual event awareness module 112 operates to determine that the risk assessment exceeds a predetermined threshold. Contextual event awareness module 112 operates to provide a notification of a risk to a user.

In step 202, contextual event awareness module 112 receives contextual information including motion and sound detection. In one or more embodiments, event detection 114 detects events 104 and triggers data capture module 116 to take images and or videos. In an example, event detection 114 can detect a motion event via infrared, radio, or some other motion detection means involved in events 104. Event detection 114 can use accelerometer data that can be accessed and stored in computing device 102. Gait analysis of the user can be considered by using accelerometer data readings to know the movement status of the user. Event detection 114 may trigger data capture module 116 to take images and or videos when event detection 114 detects a motion event behind or nearby the user. Event detection 114 may trigger data capture module 116 to take images and or videos when the motion is over a pre-determined threshold. In another example, event detection 114 may detect a sound event involved in events 104. A sound event may be a label that a user would use to describe a recognizable event in a region of the sound. Such a label usually allows the user to understand the concept behind it and associates this event with other known events. Sound events can be used to represent a scene in a symbolic way, e.g. an auditory scene on a busy street contains events of passing cars, car horns and footsteps of people rushing. Auditory scenes can be described with different level descriptors to represent the general context (street) and the characteristic sound events (car, car horn, and footsteps). Event detection 114 may trigger data capture module 116 to take images and or videos when event detection 114 detects a sound event behind or nearby the user. Event detection 114 may trigger data capture module 116 to take images and or videos when the sound is over a pre-defined threshold. Event detection 114 may trigger data capture module 116 to take images and or videos when the sound event is a pre-defined event that the user may be interested. In yet another example, event detection 114 may detect events 104 in a suitable sensing or detection method and trigger data capture module 116 to take images and or videos.

In one or more embodiments, data capture module 116 may capture event data involved in events 104. Data capture module 116 can be triggered to take images and or videos associated with events 104 when event detection 114 detects events 104. In an example, data capture module 116 can be triggered to take images and or videos associated with events 104 when event detection 114 detects a motion involved with events 104. In another example, data capture module 116 can be triggered to take images and or videos associated with events 104 when event detection 114 detects a sound event involved with events 104. In an example, data capture module 116 may take images with a camera. The camera may be incorporated within data capture module 116. Data capture module 116 may take images in a sequence with multiple and continuous shots. In another example, data capture module 116 may take videos with a camcorder. The camcorder may be incorporated within data capture module 116. Data capture module 116 may capture and sample images from the videos taken. Data capture module 116 may send the captured data, for example, images and or videos, to processing engine 124 to determine contextual information of events 104.

In step 204, contextual event awareness module 112 may determine a proximity sequencing including context of an event. Contextual event awareness module 112 analyzes the contextual information detected from event detection 114 and captured from data capture module 116 to determine a proximity sequencing including a plurality of events, a sequence of the events, and a context of the events. In one or more embodiments, processing engine 124 may analyze the data captured from data capture module 116 to make determination of the contextual information about events 104. Processing engine 124 may categorize events 104 as interesting, neutral, or uninteresting events for the user. Processing engine 124 may communicate notification module 120 to send a user a notification accordingly. For example, when processing engine 124 categorizes events 104 as interesting events or entities for the user, processing engine 124 may communicate notification module to send the user a notification that events 104 would be interested to the user.

In an example, processing engine 124 may identify and recognize the entities involved in events 104 in images captured from data capture module 116. In some examples, the entities can be persons. The entities can be vehicles, building objects, flashlights, or any other subjects that are involved in events 104. Processing engine 124 may use object recognition technology for finding and identifying the entities in the images. Object recognition technology may include edge detection, edge matching, greyscale matching, gradient matching, appearance-based methods, feature-based methods, and other suitable recognition technology for identifying objects in an image or video frame. For example, processing engine 124 may identify the entities such as people, animals, vehicles, and background objects from each image. Processing engine 124 may generate a description that captures not only the entities contained in an image, but can also express how the entities relate to each other as well as events 104 that the entities are involved in.

In an example, processing engine 124 may include deep neural network 126. Deep neural network 126 may be an artificial neural network with multiple layers between the input and output layers. In the depicted embodiment, deep neural network 126 includes encoder-decoder model 128 and classifier 134. Encoder-decoder model 128 may be a model for attention gathering based on pattern sequencing. For example, encoder-decoder model 128 may be a neural network that learns to encode a variable-length sequence into a fixed-length vector representation and to decode a given fixed-length vector representation back into a variable-length sequence. Encoder-decoder model 128 can be trained as an end-to-end neural network. In an example, encoder-decoder model 128 can automatically view an image and generate a reasonable description of the image. Encoder-decoder model 128 may be based on a convolution neural network that encodes an image into a compact representation, followed by a recurrent neural network that generates a corresponding sentence. Encoder-decoder model 128 may be trained to maximize the likelihood of the sentence given the image.

In an example, encoder-decoder model 128 may include encoder 130 and decoder 132. Encoder-decoder model 128 may combine the convolutional neural network of encoder 130 for image classification with the recurrent neural network of decoder 132 for sequence modeling, to create a single network that generates descriptions of images. In an example, encoder-decoder model 128 may use encoder 103 as an image encoder, by pre-training it for an image classification task and using the last hidden layer as an input to decoder 132 that generates sentences from images captured in data capture module 116.

In one or more embodiments, encoder 130 may be responsible for stepping through the input time steps and encoding the entire sequence into a fixed length vector called a context vector. In an example, encoder 130 may be a convolutional neural network. A convolutional neural network can be a class of deep neural networks for analyzing images and generating image descriptions. Encoder 130 can be pre-trained and configured to generate image description for each image captured from data capture module 116. Encoder 130 can, for example, be a class of deep neural networks for analyzing visual imagery. Encoder 130 may employ a mathematical operation called convolution. In general, convolution is a specialized kind of linear operation. Encoder 130 may include an input and an output layer, as well as multiple hidden layers. The hidden layers of encoder 130 may include a series of convolutional layers that convolve with a multiplication or other dot product. Encoder 130 may use convolution in place of general matrix multiplication in at least one of their layers. In another embodiment, encoder 130 may be any other neural network or machine learning model that is able to generate image description for each image. Encoder 130 may use a convolutional neural network for the representation of images. Encoder 130 may batch normalization and yield a better performance on a classification competition. Encoder 130 may generalize a scene classification by means of transfer learning.

In one or more embodiments, decoder 132 may be responsible for stepping through the output time steps while reading from the context vector. In an example, decoder 132 can be a recurrent neural network. The recurrent neural network may be a class of artificial neural networks where connections between nodes form a directed graph along a temporal sequence. A recurrent neural network may use its internal state (memory) to process sequences of inputs of frame descriptions. Decoder 132 may be trained in the context of the single end-to-end network of encoder-decoder model 128.

In an example, encoder-decoder model 128 may take a dataset for nearby contextual situation and run with a sequence of time steps to score the annotations for the second time step as: h1=encoder (x1, x2, x3) where x1-x3 are inputs in the network at the initial time step. Scoring may be performed by using a function a ( ). Each annotation (h)

may be scored for the first output time step as: e11=a (0, h1); e12=a (0, h2); e13=a (0, h3). Two subscripts may be used for these scores, e.g., e11 where the first "1" represents the output time step, and the second "1" represents the input time step. In another example, e21=a (s1, h1); e22=a(s1, h2); e23=a(s1, h3) where the function a ( ) is called the alignment model and these normalized scores evaluated using a softmax function are called annotation weights. The annotation weights predict the possibility of a potential risk. The information of the possibility of a potential risk may be relayed to the user via alerts so that the user's attention is diverted to subject of interest (said contextual situation). The softmax annotation weights (a) may be calculated given the calculated alignment scores (e): a11=exp(e11)/(exp(e11)+exp(e12)+exp(e13)). Decoding may be performed as per encoder-decoder model 128 using the attended context vector for the current time step. Output from encoder-decoder model 128 may be fed into classifier 134.

In step 206, contextual event awareness module 112 applies machine learning to the proximity sequencing to form a risk assessment. The risk assessment may be based on the context of the event impacting a user. In the depicted embodiment, deep neural network 126 includes encoder-decoder model 128 and classifier 134. Classifier 134 is configured to receive output data from encoder-decoder model 128. Classifier 134 is configured to classify the received output data into an interesting event if the user should be notified of events 104. Classifier 134 may categorize events 104 as an uninteresting event if events 104 do not merit a notification. If the output trigger is more than a pre-determined risk threshold, classifier 134 triggers a risk indication of the event with information to distract the user through a notification. Events 104 may be categorized based on the machine learning as interesting based on a user profile and a learned pattern history. In an example, classifier 134 may be a multi-label classification. The training set for classifier 134 may be composed of instances each associated with a set of labels, and the task is to predict the label sets of unseen instances through analyzing training instances with known label sets. Each label in a multi-label classification represents a different classification task, but the tasks are related. For example, an instance of multi-label classification can be a text about any of religion, politics, finance or education at the same time or none of these. Multi-label classification tasks may be ubiquitous in real-world problems. For example, in a text categorization, each document may belong to several predefined topics. Instances in the training set may be each associated with a set of labels, and the task is to output the label set for the unseen instance whose set size is not available a priori. In an example, a multi-label classification algorithm named ML-kNN, i.e. multi-label k-nearest neighbor, is derived from a k-nearest neighbor (kNN) algorithm. ML-kNN may identify the k nearest neighbors of the test instance where the label sets of its neighboring instances are obtained. After that, maximizing a posteriori principle is employed to predict the set of labels of the test instance.

In step 208, contextual event awareness module 112 determines that a risk assessment exceeds a predetermined threshold. In the depicted embodiment, classifier 134 includes determination module 136. Determination module 136 may determine that a risk assessment exceeds the predetermined threshold. For example, determination module 136 may trigger a risky event with information to distract the user through a notification when the output trigger is more than a pre-determined risk threshold. In an example, determination module 136 may determine the context of events 104 and provide an ameliorative trigger notification when the context of events 104 is determined to be significant. Determination module 136 may deploy an ameliorative notification strategy in a proactive fashion.

In step 210, contextual event awareness module 112 provides a notification of a risk to a user. Notification module 120 may present a notification when an event is risky or interesting to the user. The notification can be presented in various notification means, for example, in an augmented reality displayed message, via haptic vibration, and or by an audio or voice. If no notification is to be delivered, the event information can be ignored or discarded. Feedback module 122 may provide feedback about the usefulness of the notification delivered from notification module 120. If a notification is delivered, the user can be asked to provide feedback about the usefulness of the notification. The feedback allows contextual event awareness module 112 to learn via reinforcement learning. Contextual event awareness module 112 may utilize the feedback received from the user to determine the significance of events 104. Contextual event awareness module 112 may transfer information about the risk to another user in a vicinity via ad-hoc network 110.

Figure 3:
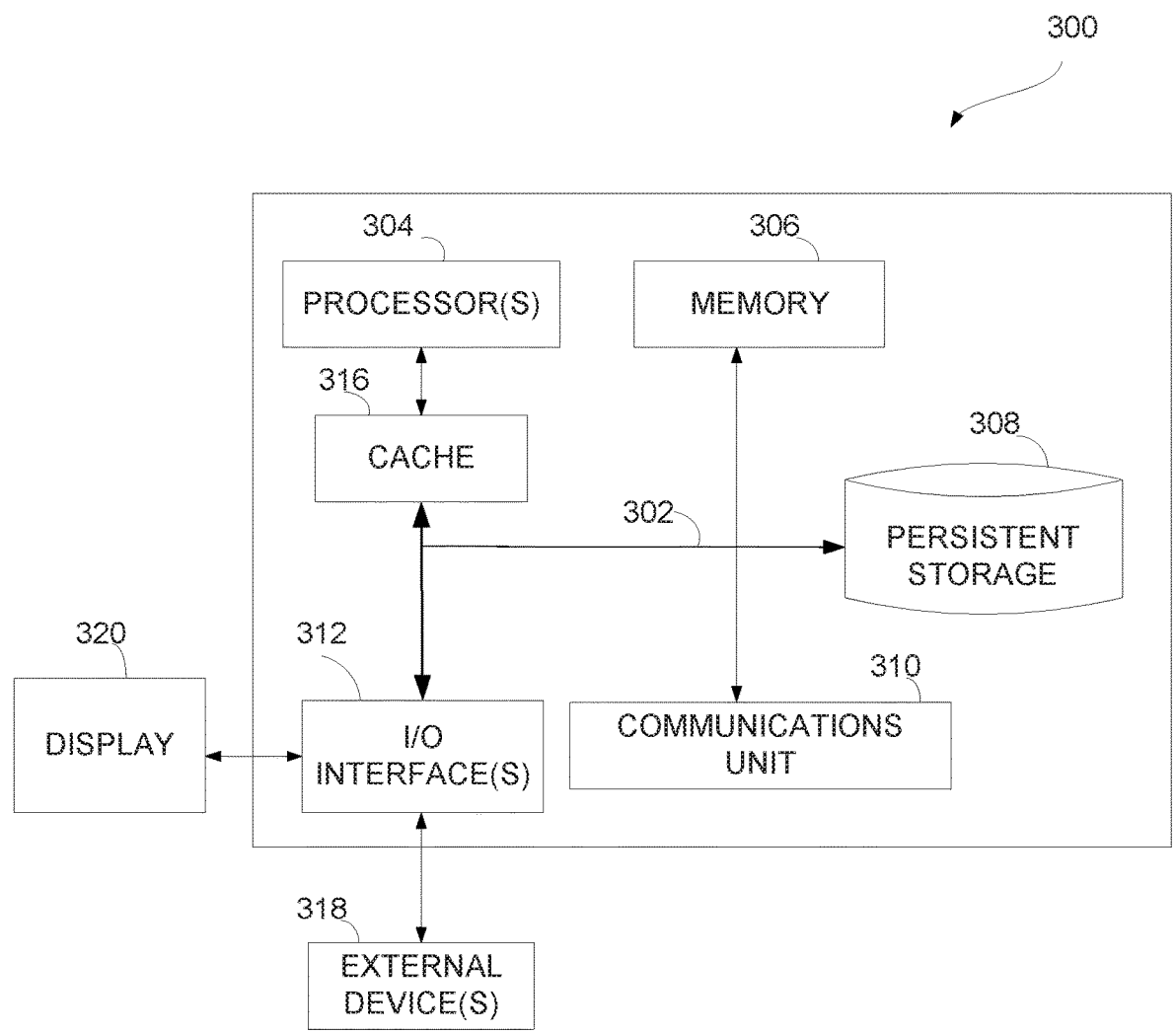
FIG. 3 is a block diagram of components of the computing device of FIG. 1, in accordance with an embodiment of the present disclosure.

FIG. 3 depicts a block diagram 300 of components of computing device 102 in accordance with an illustrative embodiment of the present disclosure. It should be appreciated that FIG. 3 provides only an illustration of one implementation and does not imply any limitations with regard to the environments in which different embodiments may be implemented. Many modifications to the depicted environment may be made.

Computing device 102 may include communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Contextual event awareness module 112 may be stored in persistent storage 308 and in memory 306 for execution by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Contextual event awareness module 112 may be downloaded to persistent storage 308 through communications unit 310.

I/O interface(s) 312 allows for input and output of data with other devices that may be connected to computing device 102. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., contextual event awareness module 112 can be stored on such portable computer readable storage media and can be loaded onto persistent storage 308 via I/O interface(s) 312. I/O interface(s) 312 also connect to display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
   receiving, by one or more processors of a user mobile device, contextual information including motion and sound detection by using accelerometer data to know a movement status of a user of the user mobile device based on a gait analysis of the user of the user mobile device;
   analyzing, by the one or more processors of the user mobile device, the contextual information to determine a proximity sequencing including context of an event, wherein analyzing the contextual information comprises:
   combining a convolutional neural network for classification with a recurrent neural network for sequence modeling;
   applying, by the one or more processors of the user mobile device, machine learning to the proximity sequencing to form a risk assessment based on the context of the event impacting the user of the user mobile device, wherein the risk assessment is based on the convolutional neural network, the recurrent neural network, and a classifier determining a significance of the event and deploying an ameliorative notification strategy, wherein the event is categorized, based on the machine learning, as interesting based on a user profile and a learned pattern history, the user profile and learned pattern history being updated as input training data;
   utilizing, by the one or more processors of the user mobile device, feedback received from the user of the user mobile device to determine the significance of the event;
   determining, by the one or more processors of the user mobile device, that the risk assessment exceeds a predetermined threshold;
   providing, by the one or more processors of the user mobile device, a notification of a risk to the user of the user mobile device; and
   transferring, by the one or more processors of the user mobile device, information about the risk to a second user mobile device of a second user in a vicinity of the user of the user mobile device via an ad-hoc network.

2. The computer-implemented method of claim 1, wherein providing the notification includes delivering the notification selected from a group consisting of: an augmented reality displayed message, a haptic vibration, and audio.

3. A computer program product comprising:
   one or more computer readable storage media, and program instructions collectively stored on the one or more computer readable storage media, the program instructions comprising:
   program instructions to receive, by a user mobile device, contextual information including motion and sound detection by using accelerometer data to know a movement status of a user of the user mobile device based on a gait analysis of the user of the user mobile device;
   program instructions to analyze, by the user mobile device, the contextual information to determine a proximity sequencing including context of an event, wherein program instructions to analyze the contextual information comprise:
   program instructions to combine, by the user mobile device, a convolutional neural network for classification with a recurrent neural network for sequence modeling;
   program instructions to apply, by the user mobile device, machine learning to the proximity sequencing to form a risk assessment based on the context of the event impacting the user of the user mobile device, wherein the risk assessment is based on the convolutional neural network, the recurrent neural network, and a classifier determining a significance of the event and deploying an ameliorative notification strategy, wherein the event is categorized, based on the machine learning, as interesting based on a user profile and a learned pattern history, the user profile and learned pattern history being updated as input training data;
   program instructions to utilize, by the user mobile device, feedback received from the user of the user mobile device to determine the significance of the event;

program instructions to determine, by the user mobile device, that the risk assessment exceeds a predetermined threshold;

program instructions to provide, by the user mobile device, a notification of a risk to the user of the user mobile device; and program instructions to transfer, by the user mobile device, information about the risk to a second user mobile device of a second user in a vicinity of the user of the user mobile device via an ad-hoc network.

4. The computer program product of claim 3, wherein program instructions to provide the notification include program instructions to deliver the notification selected from a group consisting of: an augmented reality displayed message, a haptic vibration, and audio.

5. A user mobile device comprising:
one or more computer processors,
one or more computer readable storage media, and
program instructions stored on the one or more computer readable storage media for execution by at least one of the one or more computer processors, the program instructions comprising:

program instructions to receive, by the user mobile device, contextual information including motion and sound detection by using accelerometer data to know a movement status of a user of the user mobile device based on a gait analysis of the user of the user mobile device;

program instructions to analyze, by the user mobile device, the contextual information to determine a proximity sequencing including context of an event, wherein program instructions to analyze the contextual information comprise:

program instructions to combine, by the user mobile device, a convolutional neural network for classification with a recurrent neural network for sequence modeling;

program instructions to apply, by the user mobile device, machine learning to the proximity sequencing to form a risk assessment based on the context of the event impacting the user of the user mobile device, wherein the risk assessment is based on the convolutional neural network, the recurrent neural network, and a classifier determining a significance of the event and deploying an ameliorative notification strategy, wherein the event is categorized, based on the machine learning, as interesting based on a user profile and a learned pattern history, the user profile and learned pattern history being updated as input training data;

program instructions to utilize, by the user mobile device, feedback received from the user of the user mobile device to determine significance of the event;

program instructions to determine, by the user mobile device, that the risk assessment exceeds a predetermined threshold;

program instructions to provide, by the user mobile device, a notification of a risk to the user of the user mobile device; and program instructions to transfer, by the user mobile device, information about the risk to a second user mobile device of a second user in a vicinity of the user of the user mobile device via an ad-hoc network.

* * * * *